US010387065B2

(12) United States Patent
Lee et al.

(10) Patent No.: US 10,387,065 B2
(45) Date of Patent: *Aug. 20, 2019

(54) MEMORY SYSTEM AND OPERATING METHOD THEREOF

(71) Applicant: SK hynix Inc., Gyeonggi-do (KR)

(72) Inventors: Jong-Min Lee, Seoul (KR); Jee-Yul Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 67 days.

This patent is subject to a terminal disclaimer.

(21) Appl. No.: 15/602,320

(22) Filed: May 23, 2017

(65) Prior Publication Data

US 2018/0074710 A1   Mar. 15, 2018

(30) Foreign Application Priority Data

Sep. 9, 2016  (KR) .................. 10-2016-0116196

(51) Int. Cl.
*G06F 3/00* (2006.01)
*G06F 3/06* (2006.01)

(52) U.S. Cl.
CPC ............ *G06F 3/064* (2013.01); *G06F 3/0604* (2013.01); *G06F 3/0679* (2013.01)

(58) Field of Classification Search
CPC ....... G06F 3/064; G06F 3/0679; G06F 3/0604
See application file for complete search history.

(56) References Cited

U.S. PATENT DOCUMENTS

| | | | | |
|---|---|---|---|---|
| 6,377,500 | B1* | 4/2002 | Fujimoto | ............ G06F 12/0246 365/230.01 |
| 7,870,351 | B2 | 1/2011 | Resnick | |
| 8,069,297 | B2 | 11/2011 | Nishihara | |
| 2013/0151795 | A1 | 6/2013 | Lee | |
| 2017/0139645 | A1* | 5/2017 | Byun | .................... G06F 3/0619 |
| 2017/0147259 | A1* | 5/2017 | Lee | ........................ G06F 3/0604 |
| 2018/0024745 | A1* | 1/2018 | Lee | ........................ G06F 3/064 711/103 |

FOREIGN PATENT DOCUMENTS

KR    1020150032877    3/2015

* cited by examiner

*Primary Examiner* — Francisco A Grullon
(74) *Attorney, Agent, or Firm* — IP & T Group LLP

(57) ABSTRACT

A memory system may include: a memory device including a plurality of pages in which data are stored and a plurality of memory blocks which include the pages; and a controller suitable for storing data segments of user data corresponding to a write command received from a host, in the pages included in the memory blocks, generating map segments of map data corresponding to storage of the data segments and lists, and searching and updating the map segments through the lists.

20 Claims, 11 Drawing Sheets

MEMORY SYSTEM AND OPERATING METHOD THEREOF

CROSS-REFERENCE TO RELATED APPLICATION

This application claims priority under 35 U.S.C. § 119 to Korean Patent Application No. 10-2016-0116196 filed on Sep. 9, 2016 in the Korean Intellectual Property Office, the disclosure of which is incorporated herein by reference in its entirety.

TECHNICAL FIELD

Exemplary embodiments relate to a memory system, and more particularly, to a memory system which processes data to and from a memory device, and an operating method thereof.

DISCUSSION OF THE RELATED ART

The computer environment paradigm has changed to ubiquitous computing systems that can be used anytime and anywhere. Due to this, use of portable electronic devices such as mobile phones, digital cameras, and notebook computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts. Examples of memory systems having such advantages include universal serial bus (USB) memory devices, memory cards having various interfaces, and solid state drives (SSD).

SUMMARY

Various embodiments are directed to a memory system capable of quickly and stably processing data thereto and therefrom, and an operating method thereof.

In an embodiment, a memory system may include: a memory device including a plurality of memory blocks; and a controller suitable for storing data segments of user data in the memory blocks, generating map segments of map data according to the storing of the data segments, and lists, and searching and updating the map segments through the lists.

The controller may generate map information corresponding to the data segments, generates a first list for the map information, and generates a second list for the map segments including the map information.

The controller may further record logical page numbers of the data segments as indexes of the map information in the first list.

In the second list, the controller may further record indexes of the map segments in correspondence to a maximum number of map information to be included in each of the map segments and the indexes of the map information.

In the second list, the controller may further record offsets and counts of the map segments by the indexes of the map segments.

The offsets may indicate positions of the map information included in the respective map segments in the first list.

The positions of the map information may indicate positions from map information of a first entry in the first list.

The counts may indicate the numbers of map information included in the respective map segments.

The controller may further check the counts through differences between the offsets of the map segments.

The controller may further sort the indexes of the map information in the first list, in correspondence to the logical page numbers, and sorts the indexes of the map segments in the second list.

In an embodiment, method for operating a memory system including a memory device having a plurality of memory blocks, the method may include: storing data segments of user data in the memory blocks; generating map segments of map data according to the storing of the data segments, and lists; and searching and updating the map segments through the lists.

The generating of the map segments may include: generating map information corresponding to the data segments; generating a first list for the map information; and generating a second list for the map segments including the map information.

The generating of the map segments may further include recording logical page numbers of the data segments as indexes of the map information in the first list.

The generating of the map segments may further include recording, in the second list, indexes of the map segments in correspondence to a maximum number of map information to be included in each of the map segments and the indexes of the map information.

The generating of the map segments may further include recording, in the second list, offsets and counts of the map segments, by the indexes of the map segments.

The offsets may indicate positions of the map information included in the respective map segments in the first list.

The positions of the map information may indicates positions from map information of a first entry in the first list.

The counts may indicate the numbers of map information included in the respective map segments.

The generating of the map segments may further include checking the counts through differences between the offsets of the map segments.

The generating of the map segments may further include sorting the indexes of the map information in the first list, in correspondence to the logical addresses or the logical page numbers, and sorting the indexes of the map segments in the second list.

BRIEF DESCRIPTION OF THE DRAWINGS

These and other features and advantages of the present invention will become apparent to those skilled in the art to which the present invention pertains from the following detailed description in reference to the accompanying drawings, wherein.

DETAILED DESCRIPTION

Figure 1:
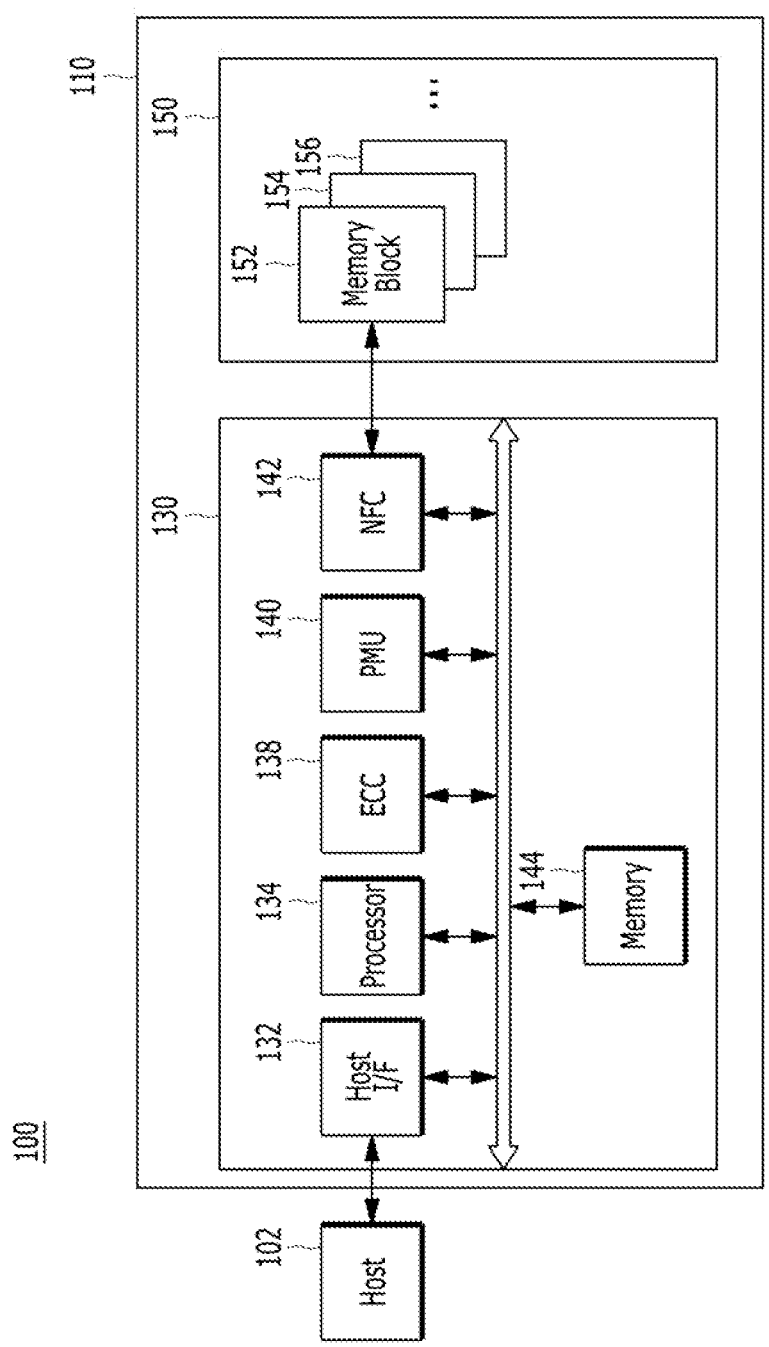
FIG. 1 is a block diagram illustrating a data processing system including a memory system in accordance with an embodiment of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "Includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 including a memory system 100 in accordance with an embodiment of the present invention.

Referring to FIG. 1, the data processing system 100 may include a host 102 and the memory system 110.

The host 102 may include portable electronic devices such as a mobile phone, an MP3 player and a laptop computer or non-portable electronic devices such as a desktop computer, a game machine, a TV and a projector.

The host 102 may include at least one OS (operating system), and the OS may manage and control overall functions and operations of the host 102, and provide an operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user. For example, the personal OS configured to support a function of providing a service to general users may include Windows and Chrome, and the enterprise OS configured to secure and support high performance may include Windows server, Linux and Unix. Furthermore, the mobile OS configured to support a function of providing a mobile service to users and a power saving function of a system may include Android, iOS and Windows Mobile. At this time, the host 102 may include a plurality of OSs, and execute an OS to perform an operation corresponding to a user's request on the memory system 110.

The memory system 110 may operate to store data for the host 102 in response to a request of the host 102. Non-limited examples of the memory system 110 may include solid state drive (SSD), multi-media card (MMC), secure digital (SD) card, universal storage bus (USB) device, universal flash storage (UFS) device, compact flash (CF) card, smart media card (SMC), personal computer memory card international association (PCMCIA) card and memory stick. The MMC may include an embedded MMC (eMMC), reduced size MMC (RS-MMC) and micro-MMC, and the SD card may include a mini-SD card and micro-SD card.

The memory system 110 may be embodied by various types of storage devices. Non-limited examples of storage devices included in the memory system 110 may include volatile memory devices such as DRAM dynamic random access memory (DRAM) and static RAM (SRAM) and nonvolatile memory devices such as read only memory (ROM), mask ROM (MROM), programmable ROM (PROM), erasable programmable ROM (EPROM), electrically erasable programmable ROM (EEPROM), ferroelectric RAM (FRAM), phase-change RAM (PRAM), magneto-resistive RAM (MRAM), resistive RAM (RRAM) and flash memory. The flash memory may have a 3-dimensioanl (3D) stack structure.

The memory system 110 may include a memory device 150 and a controller 130. The memory device 150 may store data for the host 102, and the controller 130 may control data storage into the memory device 150.

The controller 130 and the memory device 150 may be integrated into a single semiconductor device, which may be included in the various types of memory systems as exemplified above. For example, the controller 130 and the memory device 150 may be integrated as one semiconductor device to constitute an SSD. When the memory system 110 is used as an SSD, the operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a PCMCIA (personal computer memory card international association) card, CF card, SMC (smart media card), memory stick, MMC including RS-MMC and micro-MMC, SD card including mini-SD, micro-SD and SDHC, or UFS device.

Non-limited application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory dies (not shown), each memory die including a plurality of planes (not shown), each plane including a plurality of memory blocks 152 to 156, each of the memory blocks 152 to 156 may include a plurality of pages, and each of the pages may include a plurality of memory cells coupled to a word line. In an embodiment, the memory device 150 may a flash memory having a 3-dimensional (3D) stack structure.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) unit 132, a processor 134, an error correction code (ECC) unit 138, a Power Management Unit (PMU) 140, a memory device controller such as a NAND flash controller (NFC) 142 and a memory 144 all operatively coupled via an internal bus.

The host interface unit 132 may be configured to process a command and data of the host 102, and may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC unit 138 may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success/fail signal. When the number of error bits is more than a threshold value of correctable error bits, the ECC unit 138 may not correct the error bits, and may output an error correction fail signal.

The ECC unit 138 may perform error correction through a code such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices for error correction.

The PMU 140 may provide and manage the power requirements of the controller 130.

The 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the NFC 142 may generate a control signal for the memory device 150 and process data to be provided to the memory device 150 under the control of the processor 134. The NFC 142 may work as an interface (e.g., a NAND flash interface) for processing a command and data between the controller 130 and the memory device 150. Specifically, the NFC 142 may support data transfer between the controller 130 and the memory device 150.

The memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

The processor 134 of the controller 130 may include a management unit (not illustrated) for performing a bad management operation of the memory device 150. The management unit may perform a bad block management operation of checking a bad block, in which a program fail occurs due to the characteristic of a NAND flash memory during a program operation, among the plurality of memory blocks 152 to 156 included in the memory device 150. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Figure 2:
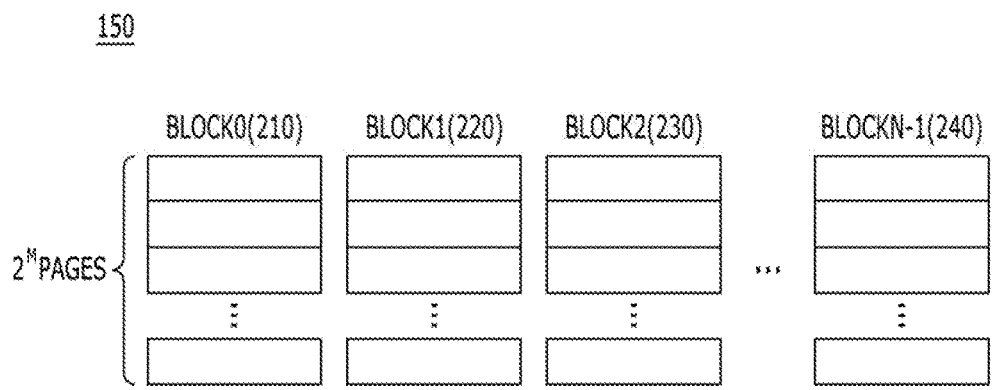
FIG. 2 is a schematic diagram illustrating an exemplary configuration of a memory device employed in the memory system of FIG. 1.

FIG. 2 is a schematic diagram illustrating the memory device 150.

Referring to FIG. 2, the memory device 150 may include a plurality of memory blocks 0 to N−1, and each of the blocks 0 to N−1 may include a plurality of pages, for example, $2^M$ pages, the number of which may vary according to circuit design. Memory cells included in the respective memory blocks 0 to N−1 may be one or more of a single level cell (SLC) storing 1-bit data, or a multi-level cell (MLC) storing 2 or more bit data, such as an MLC storing 2-bit data, a triple level cell (TLC) storing 3-bit data, a quadruple level cell (QLC) storing 4-bit level cell, an MLC storing 5-bit data, and so forth.

Figure 3:
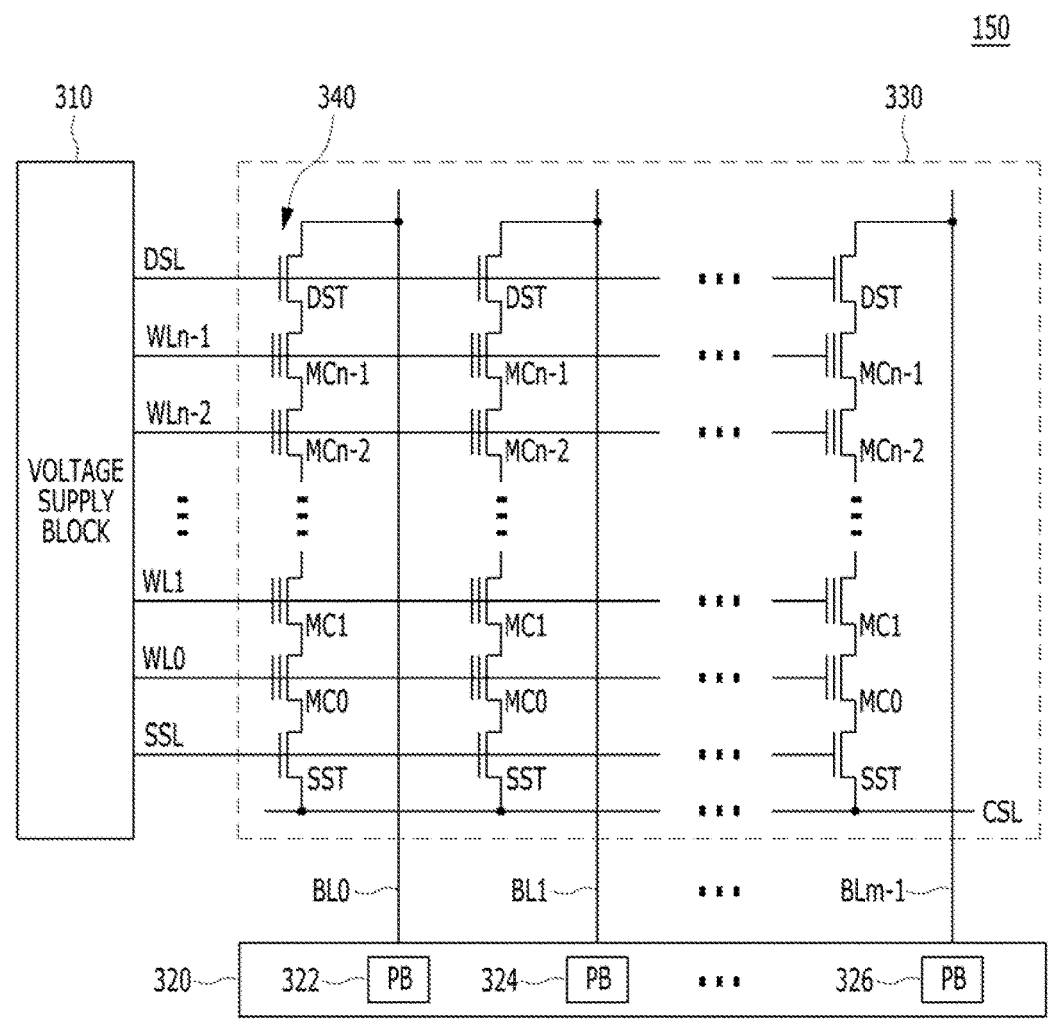
FIG. 3 is a circuit diagram illustrating an exemplary configuration of a memory cell array of a memory block in the memory device of FIG. 2.

FIG. 3 is a circuit diagram illustrating an exemplary configuration of a memory cell array of a memory block in the memory device 150.

Referring to FIG. 3, a memory block 330 which may correspond to any of the plurality of memory blocks 152 to 156 included in the memory device 150 of the memory system 110 may include a plurality of cell strings 340 coupled to a plurality of corresponding bit lines BL0 to BLm−1. The cell string 340 of each column may include one or more drain select transistors DST and one or more source select transistors SST. Between the select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not illustrated). Under the control of the control circuit, the voltage supply unit 310 may select one of the memory blocks (or sectors) of the memory cell array, select one of the word lines of the selected memory block, and provide the word line voltages to the selected word line and the unselected word lines.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
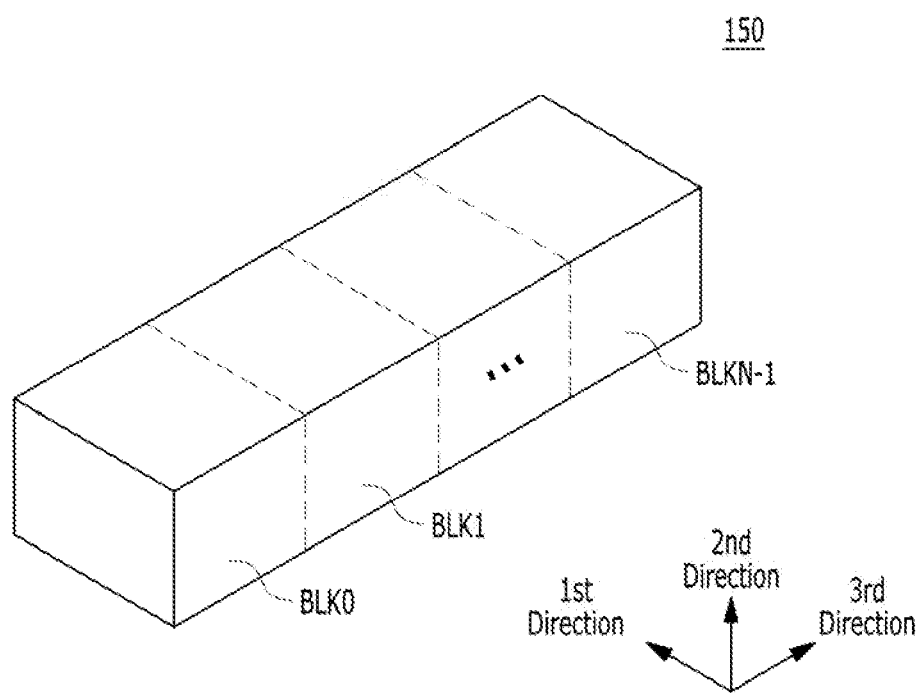
FIG. 4 is a schematic diagram illustrating an exemplary three-dimensional structure of the memory device of FIG. 2.

FIG. 4 is a schematic diagram illustrating an exemplary 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each of the memory blocks having a 3D structure (or vertical structure).

FIGS. 5 to 8 are schematic diagrams illustrating a data processing operation to a memory device in a memory system in accordance with an embodiment.

Hereinbelow, in the embodiment of the present disclosure, descriptions will be made, as an example, for data processing in the case where, after storing write data corresponding to a write command received from the host 102, in the buffer/cache included in the memory 144 of the controller 130, the data stored in the buffer/cache are written and stored, i.e., programmed, in one or more memory blocks included in the memory device 150, and map data are updated in correspondence to the executed program operation to the memory device 150.

Further, while, in the present embodiment, it will be described below as an example for the sake of convenience in explanation that the controller 130 performs a data processing operation in the memory system 110, it is to be noted that, as described above, the processor 134 included in the controller 130 may perform a data processing operation through, for example, an FTL (flash translation layer).

For example, in an embodiment of the present disclosure, after storing user data and metadata corresponding to the write command received from the host 102, in the buffer included in the memory 144 of the controller 130, the controller 130 write and stores the data stored in the buffer, in optional memory blocks among the plurality of memory blocks included in the memory device 150, i.e., performs a program operation.

The metadata may include first map data including a logical/physical (L2P: logical to physical) information (hereinafter, referred to as a 'logical information') and second map data including a physical/logical (P2L: physical to logical) information (hereinafter, referred to as a 'physical information'), for the data stored in the memory blocks in correspondence to the program operation. Also, the metadata may include an information on the command data corresponding to the command received from the host 102, an information on the command operation corresponding to the command, an information on the memory blocks of the memory device 150 for which the command operation is to be performed, and an information on map data corresponding to the command operation. In other words, the metadata may include all remaining informations and data excluding the user data corresponding to the command received from the host 102.

In an embodiment of the present disclosure, the controller 130 performs a command operation corresponding to a command received from the host, that is, performs a program operation corresponding to a write command, for example, in the case where the write command is received from the host 102. At this time, the user data corresponding to the write command are written and stored in one or more memory blocks of the memory device 150, which are either empty memory blocks (i.e., memory blocks which have not been written with any data), open memory blocks (i.e., memory blocks which have some of their memory cells are written with data but which also have empty memory cells) or free memory blocks (i.e., memory cells which have been subjected to an erase operation). Also, the first and second map data are written and stored in the empty memory blocks, open memory blocks or the free memory blocks among the memory blocks of the memory device 150.

When receiving a write command from the host 102, the controller 103 stores user data corresponding to the write command in first memory blocks. The controller 103 also stores metadata including first and second map data for the user data in second memory blocks. In particular, in correspondence to storing the data segments of the user data in the memory blocks of the memory device 150, the controller 130 generates and updates the meta segments of the metadata, that is, the L2P segments of the first map data and the P2L segments of the second map data as the map segments of the map data, and stores the map segments in the memory blocks of the memory device 150. At this time, the controller 130 updates the map segments stored in the memory blocks of the memory device 150, by loading them in the memory 144 of the controller 130.

Figure 5:
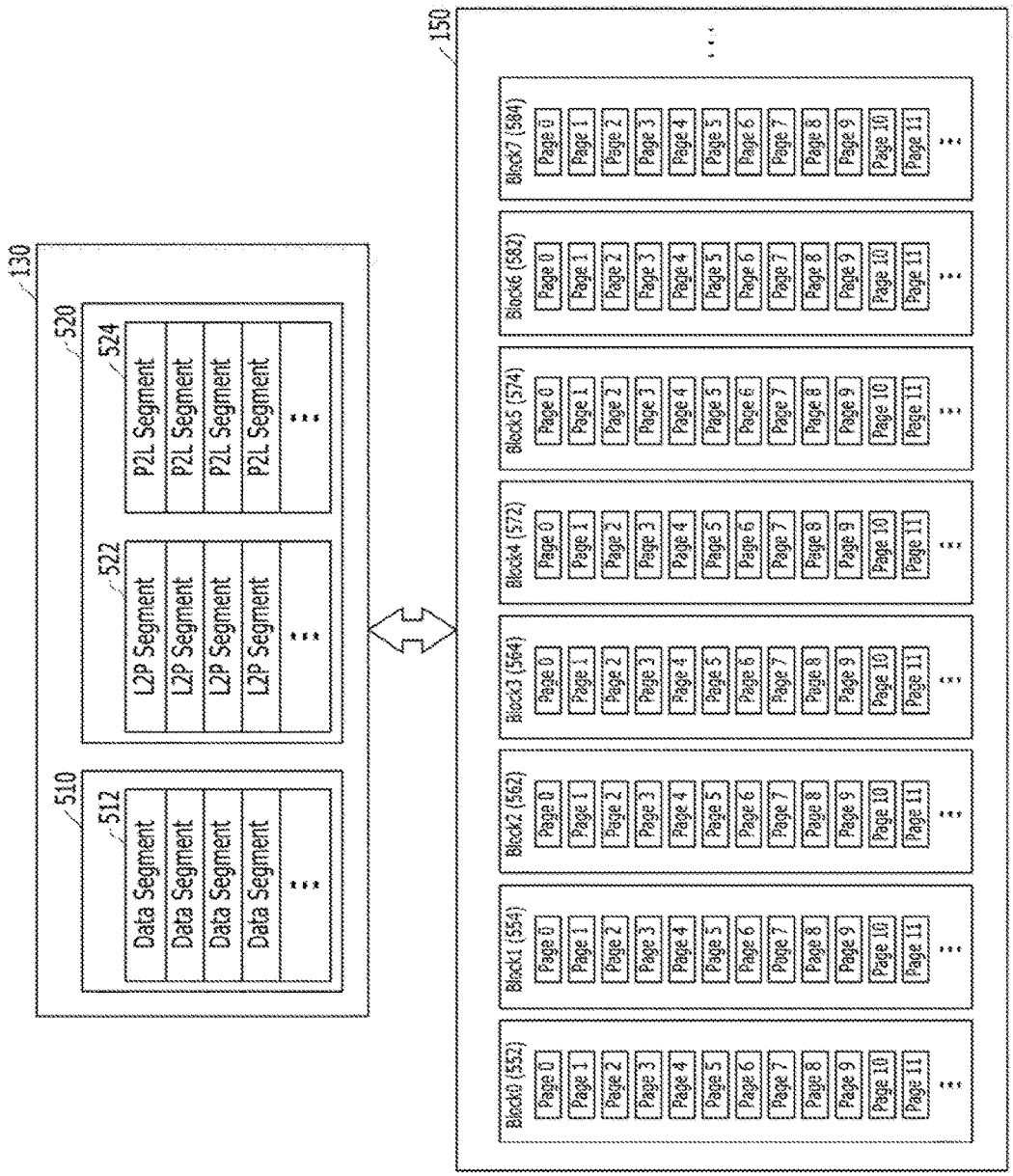
FIGS. 5 to 8 are schematic diagrams illustrating a data processing operation to a memory device in a memory system in accordance with an embodiment.

Referring to FIG. 5, the controller 130 performs a command operation corresponding to a command received from the host 102, for example, a program operation corresponding to a write command received from the host 102. At this time, the controller 130 writes and stores user data corresponding to the write command, in memory blocks 552, 554, 562, 564, 572, 574, 582 and 584 of the memory device 150. Also, in correspondence to the write operation to the memory blocks 552, 554, 562, 564, 572, 574, 582 and 584, the controller 130 generates and updates metadata for the user data and writes and stores the metadata in the memory blocks 552, 554, 562, 564, 572, 574, 582 and 584 of the memory device 150.

The controller 130 generates and updates information indicating that the user data are stored in the pages included in the memory blocks 552, 554, 562, 564, 572, 574, 582 and 584 of the memory device 150, for example, first map data and second map data, that is, generates and updates the logical segments of the first map data, that is, L2P segments, and the physical segments of the second map data, that is, P2L segments, and then, stores the L2P segments and the P2L segments in the memory blocks 552, 554, 562, 564, 572, 574, 582 and 584 of the memory device 150.

For example, the controller 130 caches and buffers data segments 512 of the user data in the first buffer 510 as a data buffer/cache. Then, the controller 130 writes and stores the data segments 512 stored in the first buffer 510 in the pages included in the memory blocks 552, 554, 562, 564, 572, 574, 582 and 584 of the memory device 150.

According to the storage of the user data into the memory blocks 552 to 584, the controller 130 generates and updates the first map data and the second map data, and stores the first map data and the second map data in a second buffer 520 included in the memory 144 of the controller 130. Namely, the controller 130 stores L2P segments 522 of the first map data for the user data and P2L segments 524 of the second map data for the user data, in the second buffer 520 as a map buffer/cache. In the second buffer 520 in the memory 144 of the controller 130, there may be stored, as described above, the L2P segments 522 of the first map data and the P2L segments 524 of the second map data, or there may be stored a map list for the L2P segments 522 of the first map data and a map list for the P2L segments 524 of the second map data. The controller 130 writes and stores the L2P segments 522 of the first map data and the P2L segments 524 of the second map data which are stored in the second buffer 520, in the pages included in the memory blocks 552, 554, 562, 564, 572, 574, 582 and 584 of the memory device 150.

Also, the controller 130 may perform a read operation corresponding to a read command received from the host 102. At this time, the controller 130 loads the map segments of user data corresponding to the read command, for example, L2P segments 522 of first map data and P2L segments 524 of second map data, in the second buffer 520, and checks the L2P segments 522 and the P2L segments 524. After that, the controller 130 reads the user data stored in the pages included in corresponding memory blocks among the memory blocks 552, 554, 562, 564, 572, 574, 582 and 584 of the memory device 150, stores data segments 512 of the read user data in the first buffer 510, and provides the data segments 512 to the host 102.

Figure 6:
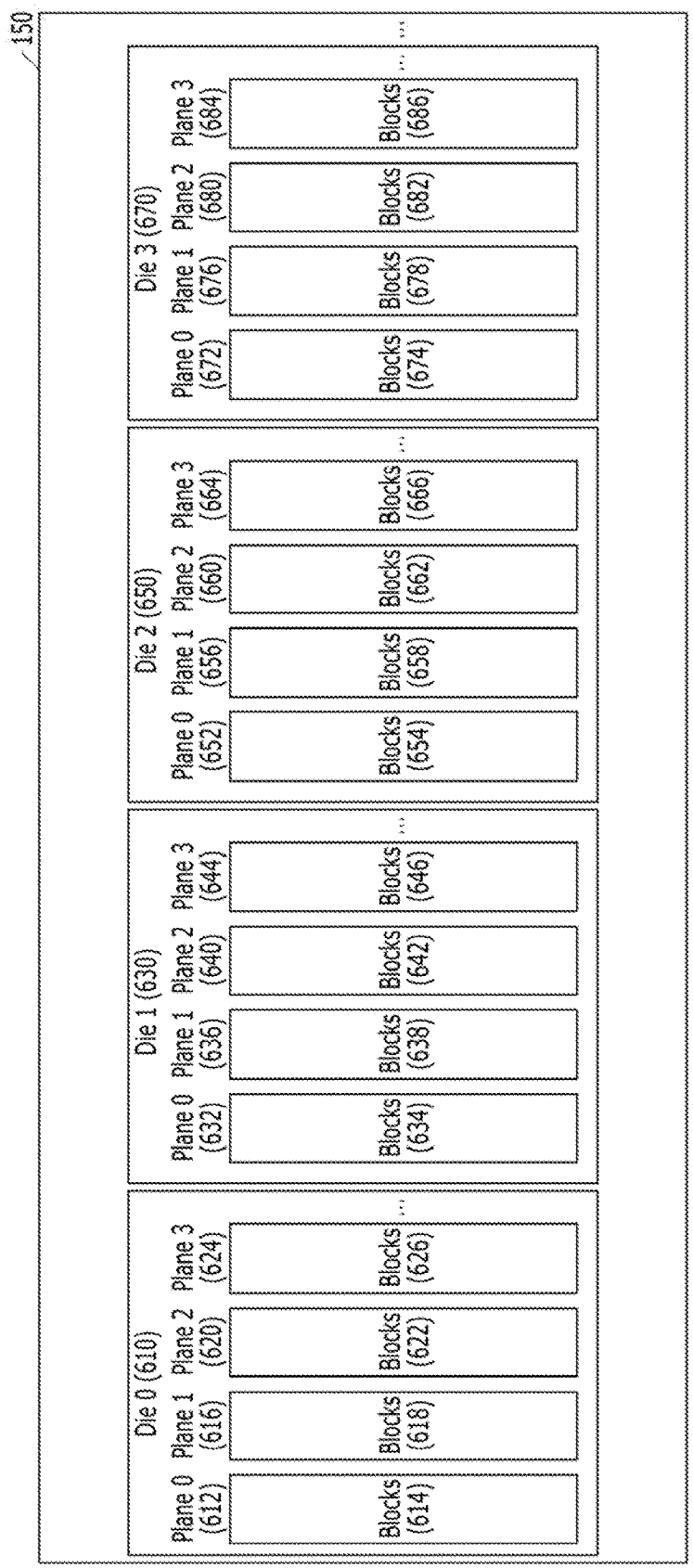

Referring to FIG. 6, the memory device 150 includes a plurality of memory dies, for example, a memory die 0 610, a memory die 1 630, a memory die 2 650 and a memory die 3 670. Each of the memory dies 610, 630, 650 and 670 includes a plurality of planes. For example, the memory die 0 610 includes a plane 0 612, a plane 1 616, a plane 2 620 and a plane 3 624, the memory die 1 630 includes a plane 0 632, a plane 1 636, a plane 2 640 and a plane 3 644, the memory die 2 650 includes a plane 0 652, a plane 1 656, a plane 2 660 and a plane 3 664, and the memory die 3 670 includes a plane 0 672, a plane 1 676, a plane 2 680 and a plane 3 684. The respective planes 612, 616, 620, 624, 632, 636, 640, 644, 652, 656, 660, 664, 672, 676, 680 and 684 in the memory dies 610, 630, 650 and 670 included in the memory device 150 include a plurality of memory blocks 614, 618, 622, 626, 634, 638, 642, 646, 654, 658, 662, 666, 674, 678, 682 and 686. The number of blocks in each plane may vary on design. Each block may include a plurality of pages, for example, 2^M number of pages, as described above with reference to FIG. 2.

In the embodiment of the present disclosure, after grouping the memory blocks 614 to 686 into a plurality of super memory blocks, user data and metadata of a command operation corresponding to a command received from the host 102 may be written and stored in the super memory blocks.

Further, in the embodiment of the present disclosure, as described above with reference to FIG. 5, in the case of performing a command operation corresponding to a command received from the host 102, for example, a program operation, after generating the L2P segments 522 of first map data and the P2L segments 524 of second map data corresponding to the program operation, the generated map segments 522 and 524 are stored in the plurality of memory blocks included in the memory device 150. Also, the map segments 522 and 524 stored in the memory blocks of the memory device 150 are loaded and updated in the second buffer 520 included in the memory 144 of the controller 130, and the updated map segments 522 and 524 are stored in the plurality of memory blocks included in the memory device 150. Hereinbelow, a program operation in the plurality of memory blocks included in the memory device 150 in the memory system in accordance with the embodiment and a map data update operation corresponding to the program operation will be described in detail with reference to FIGS. 7 and 8, by taking examples.

Figure 7:
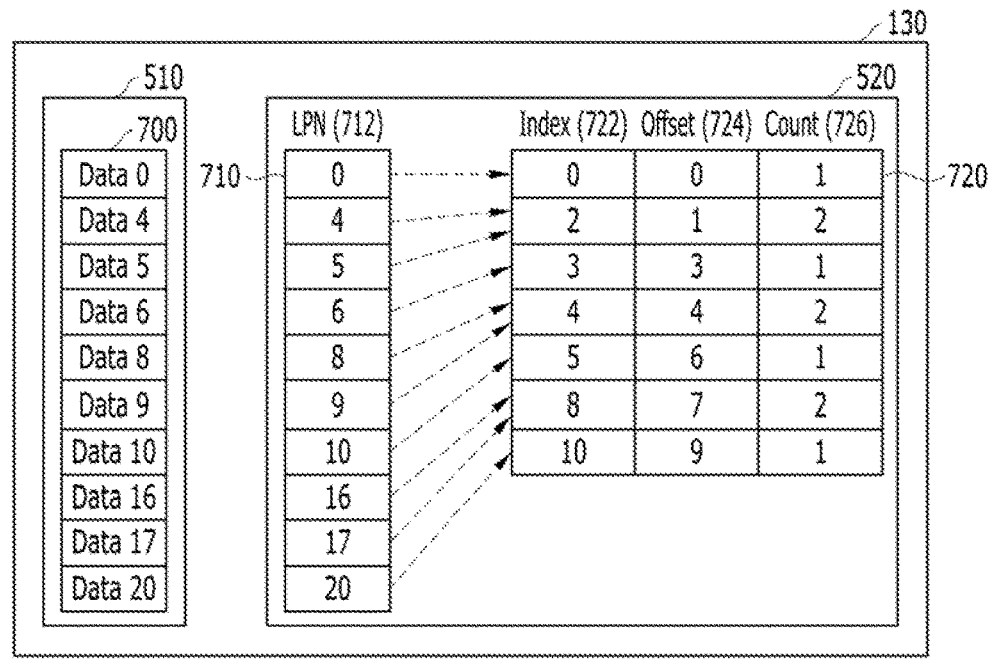

First, referring to FIG. 7, when a write command is received from the host 102, the controller 130 stores data segments 700 of user data corresponding to the write command, in the first buffer 510 included in the memory 144 of the controller 130. Each of the data segments 700 of the user data has a logical address or a logical page number (LPN) corresponding thereto. The controller 130 stores, in the first buffer 510, the data segments 700 of the user data, for example, a data segment having LPN 0 (hereinafter, referred to as 'data 0'), a data segment having LPN 4 (hereinafter, referred to as 'data 4'), a data segment having LPN 5 (hereinafter, referred to as 'data 5'), a data segment having LPN 6 (hereinafter, referred to as 'data 6'), a data segment having LPN 8 (hereinafter, referred to as 'data 8'), a data segment having LPN 9 (hereinafter, referred to as 'data 9'), a data segment having LPN 10 (hereinafter, referred to as 'data 10'), a data segment having LPN 16 (hereinafter, referred to as 'data 16'), a data segment having LPN 17 (hereinafter, referred to as 'data 17') and a data segment having LPN 20 (hereinafter, referred to as 'data 20').

The controller 130 writes and stores the data segments 700 of the user data of the first buffer 510 in the pages included in a memory block of the memory device 150, for example, memory block 0 552 of the memory device 150.

The controller 130 generates and updates informations indicating that the data segments 700 of the user data are written and stored in the pages included in the memory block 0 552 of the memory device 150, that is, map informations, and stores the map informations in the second buffer 520. At this time, the controller 130 stores the map informations in the second buffer 520 by generating a map list 710 for the map informations.

In detail, as the data segments 700 of the user data are written and stored in the pages included in the memory block 0 552 of the memory device 150, the controller 130 generates map informations corresponding to the storage of the data segments 700, and generates map segments of map data including such map informations, for example, L2P segments and P2L segments. In the embodiment of the present disclosure, for the sake of convenience in explanation, detailed descriptions will be made by exemplifying the case where map informations for data segments having a predetermined number of LPNs are included in each of map segments, for example, map informations for data segments having 2 LPNs are included in one map segment, that is, the maximum number of map informations included in one map segment is 2.

The controller 130 generates a map list 710. The map list 710 may include map information for the respective data segments 700. The map information may indicate corresponding data segment stored in one among plural pages of one among the memory blocks. For example, the controller 130 may generate a map information for the data 0 (hereinafter, referred to as a 'map information 0'), a map information for the data 4 (hereinafter, referred to as a 'map information 4'), a map information for the data 5 (hereinafter, referred to as a 'map information 5'), a map information for the data 6 (hereinafter, referred to as a 'map information 6'), a map information for the data 8 (hereinafter, referred to as a 'map information 8'), a map information for the data 9 (hereinafter, referred to as a 'map information 9'), a map information for the data 10 (hereinafter, referred to as a 'map information 10'), a map information for the data 16 (hereinafter, referred to as a 'map information 16'), a map information for the data 17 (hereinafter, referred to as a 'map information 17') and a map information for the data 20 (hereinafter, referred to as a 'map information 20'). The generated map list 710 may be stored in the second buffer 520. In the map list 710, corresponding LPNs 712 are recorded as indexes 722 of the respective map information, and the respective map information may be sorted according to logical addresses or the LPNs 712 in the map list 710. In FIG. 7, descriptions will be made by exemplifying that map information is sorted according to LPNs 712 and is recorded in the map list 710. For the case where map information is not sorted according to LPNs 712, detailed descriptions will be made with reference to FIG. 8.

In correspondence to the LPNs 712 of respective data segments 700, the corresponding LPNs 712 of map information for the respective data segments 700 may be represented by indexes 722. The map segments 0, 2 to 5, 8 and 10 including map information having respective LPNs 712 as indexes may be represented by indexes 722 depending on the LPNs of map information and the maximum number of map information included in the respective map segments. Map information for a data segment having an LPN $2i$ (hereinafter, referred to as 'data segment $2i$') and a data segment having an optional LPN $2i+1$ (hereinafter, referred to as 'data segment $2i+1$') become a map information $2i$ and a map information $2i+1$, respectively. In the case where each of map segments include 2 map information, a map segment including the map information $2i$ and the map information $2i+1$ becomes a map segment i. For example, the controller 130 generates a map segment 0 including the map information 0, a map segment 2 including the map information 4 and the map information 5, a map segment 3 including the map information 6, a map segment 4 including the map information 8 and the map information 9, a map segment 5 including the map information 10, a map segment 8 including the map information 16 and the map information 17, and a map segment 10 including the map information 20.

After storing, in the second buffer 520, map segments including respective map information, for example, the map segment 0, the map segment 2, the map segment 3, the map segment 4, the map segment 5, the map segment 8 and the map segment 10, the controller 130 stores the map segments in the memory blocks, for example, the memory block 0 552 in which the data segments 700 are stored or the memory block 1 554 in which only map segments are stored.

The controller 130 generates a segment list 720 by using the map list 710 in which map information is recorded. In the segment list 720, there are recorded indexes 722 of the map segments including the respective map information, offsets 724 indicating the positions of the map segments or the positions of the map information included in the respective map segments, and counts 726 indicating the numbers of map information included in the respective map segments.

In the indexes 722 of the segment list 720, there are recorded identifiers which indicate the map segment 0 including the map information 0, the map segment 2 including the map information 4 and the map information 5, the map segment 3 including the map information 6, the map segment 4 including the map information 8 and the map information 9, the map segment 5 including the map information 10, the map segment 8 including the map information 16 and the map information 17 and the map segment 10 including the map information 20, that is, the indexes of respective segments. The indexes 722 of the segment list 720 are sorted in correspondence to that the map information recorded in the map list 710 are sorted according to the LPNs 712.

In the offsets 724 of the segment list 720, there are recorded the positions of the respective map segments or the positions of the map information recorded in the map list 710. That is to say, for example, the map segment 0 as a first map segment in the segment list 720 becomes a start map segment, and the map information 0 as a first map information in the map list 710 becomes a start map information. In this state, the positions of the map information included in the respective map segments are recorded in the offsets 724 of the segment list 720, starting from the start map information of the map information 0. For example, in the offsets 724, there are recorded the position of the map information 0 included in the map segment 0, in the map list 710, the position of the map information 4 included in the map segment 2, in the map list 710, the position of the map information 6 included in the map segment 3, in the map list 710, the position of the map information 8 included in the map segment 4, in the map list 710, the position of the map information 10 included in the map segment 5, in the map list 710, the position of the map information 16 included in the map segment 8, in the map list 710, and the position of the map information 20 included in the map segment 10, in the map list 710.

In the counts 726 of the segment list 720, there are recorded the numbers of map information included in the respective map segments. For example, in the counts 726 of the segment list 720, there are recorded information indicating that one map information as the map information 0 is included in the map segment 0, two map information as the map information 4 and the map information 5 are included in the map segment 2, one map information as the map information 6 is included in the map segment 3, two map information as the map information 8 and the map information 9 are included in the map segment 4, one map information as the map information 10 is included in the map segment 5, two map information as the map information 16 and the map information 17 are included in the map segment 8 and one map information as the map information 20 is included in the map segment 10. The controller 130 may check the numbers of map information included in the respective map segments, through not only the counts 726 recorded in the segment list 720 but also the offsets 724 recorded in the segment list 720.

For instance, in the segment list 720, the controller 130 may check the number of map information included in the map segment 0, that is, the count 726 of the map segment 0, through the difference between the offset 724 of the map segment 0 and the offset 724 of the map segment 2, and check the number of map information included in the map segment 2, that is, the count 726 of the map segment 2, through the difference between the offset 724 of the map segment 2 and the offset 724 of the map segment 3. Further, the controller 130 may check the number of map information included in the map segment 3, that is, the count 726 of the map segment 3, through the difference between the offset 724 of the map segment 3 and the offset 724 of the map segment 4, and check the number of map information included in the map segment 4, that is, the count 726 of the map segment 4, through the difference between the offset 724 of the map segment 4 and the offset 724 of the map segment 5. Moreover, the controller 130 may check the number of map information included in the map segment 5, that is, the count 726 of the map segment 5, through the difference between the offset 724 of the map segment 5 and the offset 724 of the map segment 8, and check the number of map information included in the map segment 8, that is, the count 726 of the map segment 8, through the difference between the offset 724 of the map segment 8 and the offset 724 of the map segment 10.

As a consequence, in the memory system in accordance with the embodiment of the present disclosure, in the case of searching and checking map information and map segments to perform a command operation corresponding to a command received from the host 102 or searching and checking map information and map segments to update map data in correspondence to the performing of the command operation, the controller 130 may quickly search and check corresponding map information and map segments through the generated lists 710 and 720, as described above.

In particular, in the case of updating map data, the controller 130 may precisely and quickly check corresponding map segments which need to be updated in correspondence to performing of a command operation, through the segment list 720. According to this fact, the map segments loaded in the memory 144 of the controller 130 or the map segments stored in the memory blocks of the memory device 150 may be quickly searched and checked, and as a result, it is possible to quickly perform a map data update operation. Furthermore, even in the case of performing a command operation, by quickly searching and checking map information and map segments through the segment list 720 as described above, it is possible to quickly perform the command operation.

Figure 8:
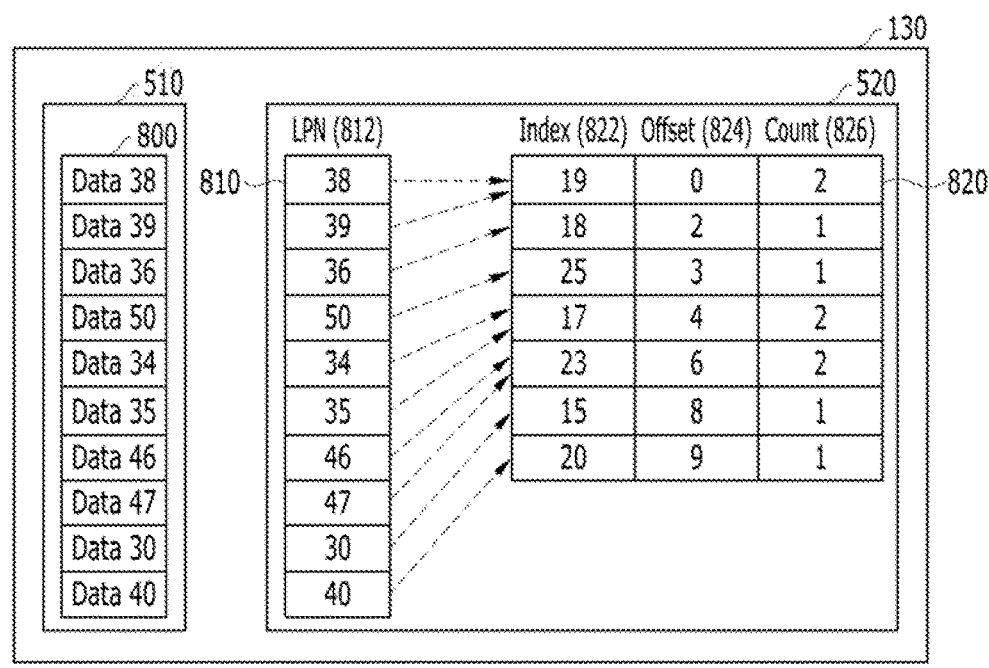

Next, referring to FIG. 8, when a write command is received from the host 102, the controller 130 stores data segments 800 of user data corresponding to the write command, in the first buffer 510 included in the memory 144 of the controller 130. Each of the data segments 800 of the user data has a logical address or an LPN corresponding thereto. The controller 130 stores, in the first buffer 510, the data segments 800 of the user data, for example, a data segment having LPN 38 (hereinafter, referred to as 'data 38'), a data segment having LPN 39 (hereinafter, referred to as 'data 39'), a data segment having LPN 36 (hereinafter, referred to as 'data 36'), a data segment having LPN 50 (hereinafter, referred to as 'data 50'), a data segment having LPN 34 (hereinafter, referred to as 'data 34'), a data segment having LPN 35 (hereinafter, referred to as 'data 35'), a data segment having LPN 46 (hereinafter, referred to as 'data 46'), a data segment having LPN 47 (hereinafter, referred to as 'data 47'), a data segment having LPN 30 (hereinafter, referred to as 'data 30') and a data segment having LPN 40 (hereinafter, referred to as 'data 40').

The controller 130 generates a map list 810. The map list 810 may include map information for the respective data segments 800. The map information may indicate corresponding data segment stored in one among plural pages of one among the memory blocks. For example, the controller 130 may generate a map information for the data 38 (hereinafter, referred to as a 'map information 38'), a map information for the data 39 (hereinafter, referred to as a 'map information 39'), a map information for the data 36 (hereinafter, referred to as a 'map information 36'), a map information for the data 50 (hereinafter, referred to as a 'map information 50'), a map information for the data 34 (hereinafter, referred to as a 'map information 34'), a map information for the data 35 (hereinafter, referred to as a 'map information 35'), a map information for the data 46 (hereinafter, referred to as a 'map information 46'), a map information for the data 47 (hereinafter, referred to as a 'map information 47'), a map information for the data 30 (hereinafter, referred to as a 'map information 30') and a map information for the data 40 (hereinafter, referred to as a 'map information 40'). The generated map list 810 may be stored in the second buffer 520. In the map list 810, corresponding LPNs 812 are recorded as indexes 722 of the respective map information, and the respective map information may be sorted according to logical addresses or the LPNs 812 in the map list 810. In FIG. 8, descriptions will be made by exemplifying that map information is not sorted according to LPNs 812.

In correspondence to the LPNs 812 of respective data segments 800, the corresponding LPNs 812 of map information for the respective data segments 800 may be represented by indexes 822. The map segments 19, 18, 25, 17, 23, 15 and 20 including map information having respective LPNs 812 as indexes may be represented by indexes 822 depending on the LPNs of map information and the maximum number of map information included in the respective map segments. Map information for a data segment having an optional LPN 2i (hereinafter, referred to as 'data segment 2i') and a data segment having an optional LPN 2i+1 (hereinafter, referred to as 'data segment 2i+1') become a map information 2i and a map information 2i+1, respectively. In the case where each of map segments include 2 map information as described above, a map segment including the map information 2i and the map information 2i+1 becomes a map segment i. For example, the controller 130 generates a map segment 19 including the map information 38 and the map information 39, a map segment 18 including the map information 36, a map segment 25 including the map information 50, a map segment 17 including the map information 34 and the map information 35, a map segment 23 including the map information 46 and the map information 47, a map segment 15 including the map information 30, and a map segment 20 including the map information 40.

After storing, in the second buffer 520, map segments including respective map information, for example, the map segment 19, the map segment 18, the map segment 25, the map segment 17, the map segment 23, the map segment 15 and the map segment 20, the controller 130 stores the map segments in the memory blocks of the memory device 150, for example, the memory block 2 562 in which the data segments 800 are stored or the memory block 3 564 in which only map segments are stored.

The controller 130 records the map informations in the map list 810 in a state in which they are not sorted according to the LPNs 812. The controller 130 generates a segment list 820 by using the map list 810 in which map information is recorded. In the segment list 820, there are recorded indexes 822 of map segments including the respective map information, offsets 824 indicating the positions of the map segments or the positions of the map information included in the respective map segments, and counts 826 indicating the numbers of map information included in the respective map segments.

In the indexes 822 of the segment list 820, there are recorded identifiers which indicate the map segment 19 including the map information 38 and the map information 39, the map segment 18 including the map information 36, the map segment 25 including the map information 50, the map segment 17 including the map information 34 and the map information 35, the map segment 23 including the map information 46 and the map information 47, the map segment 15 including the map information 30 and the map segment 20 including the map information 40, that is, the indexes of respective segments. The indexes 822 of the segment list 820 are not sorted in correspondence to the map information recorded in the map list 810, i.e., are not sorted according to the LPNs 812. In the case where the map informations recorded in the map list 810 are sorted according to the LPNs 812, the indexes 822 of the segment list 820 may be sorted in correspondence to the sorting of the map informations according to the LPNs 812.

In the offsets 824 of the segment list 820, there are recorded the positions of the respective map segments or the positions of the map information recorded in the map list 810. That is to say, for example, the map segment 19 as a first map segment in the segment list 820 becomes a start map segment, and the map information 38 as a first map information in the map list 810 becomes a start map information. In this state, the positions of the map information included in the respective map segments are recorded in the offsets 824 of the segment list 820, starting from the start map information of the map information 38. For example, in the offsets 824, there are recorded the position of the map information 38 included in the map segment 19, in the map list 810, the position of the map information 36 included in the map segment 18, in the map list 810, the position of the map information 50 included in the map segment 25, in the map list 810, the position of the map information 34 included in the map segment 17, in the map list 810, the position of the map information 46 included in the map segment 23, in the map list 810, the position of the map information 30 included in the map segment 15, in the map list 810, and the position of the map information 40 included in the map segment 20, in the map list 810.

In the counts 826 of the segment list 820, there are recorded the numbers of map information included in the respective map segments. For example, in the counts 826 of the segment list 820, there are recorded information indicating that two map information as the map information 38 and the map information 39 are included in the map segment 19, one map information as the map information 36 is included in the map segment 18, one map information as the map information 50 is included in the map segment 25, two map information as the map information 34 and the map information 35 are included in the map segment 17, two map information as the map information 46 and the map information 47 are included in the map segment 23, one map information as the map information 30 is included in the map segment 15 and one map information as the map information 40 is included in the map segment 20. The controller 130 may check the numbers of map information included in the respective map segments, through not only the counts 826 recorded in the segment list 820 but also the offsets 824 recorded in the segment list 820.

For instance, in the segment list 820, the controller 130 may check the number of map information included in the map segment 19, that is, the count 826 of the map segment 19, through the difference between the offset 824 of the map segment 19 and the offset 824 of the map segment 18, and check the number of map information included in the map segment 18, that is, the count 826 of the map segment 18, through the difference between the offset 824 of the map segment 18 and the offset 824 of the map segment 25. Moreover, the controller 130 may check the number of map information included in the map segment 25, that is, the count 826 of the map segment 25, through the difference between the offset 824 of the map segment 25 and the offset 824 of the map segment 17, and check the number of map information included in the map segment 17, that is, the count 826 of the map segment 17, through the difference between the offset 824 of the map segment 17 and the offset 824 of the map segment 23. Moreover, the controller 130 may check the number of map information included in the map segment 23, that is, the count 826 of the map segment 23, through the difference between the offset 824 of the map segment 23 and the offset 824 of the map segment 15, and check the number of map information included in the map segment 15, that is, the count 826 of the map segment 15, through the difference between the offset 824 of the map segment 15 and the offset 824 of the map segment 20.

As a consequence, in the memory system in accordance with the embodiment of the present disclosure, in the case of searching and checking map information and map segments to perform a command operation corresponding to a command received from the host 102 or searching and checking map information and map segments to update map data in correspondence to the performing of the command operation, the controller 130 may quickly search and check corresponding map information and map segments through the generated lists 810 and 820, as described above.

In particular, in the case of updating map data, the controller 130 may precisely and quickly check corresponding map segments which need to be updated in correspondence to performing of a command operation, through the segment list 820. Accordingly, the map segments loaded in the memory 144 of the controller 130 or the map segments stored in the memory blocks of the memory device 150 may be quickly searched and checked, and as a result, it is possible to quickly perform a map data update operation. Furthermore, even in the case of performing a command operation, by quickly searching and checking map information and map segments through the segment list 820 as described above, it is possible to quickly perform the command operation. Hereinbelow, an operation for processing data in a memory system in accordance with an embodiment will be described below in detail with reference to FIG. 9.

Figure 9:
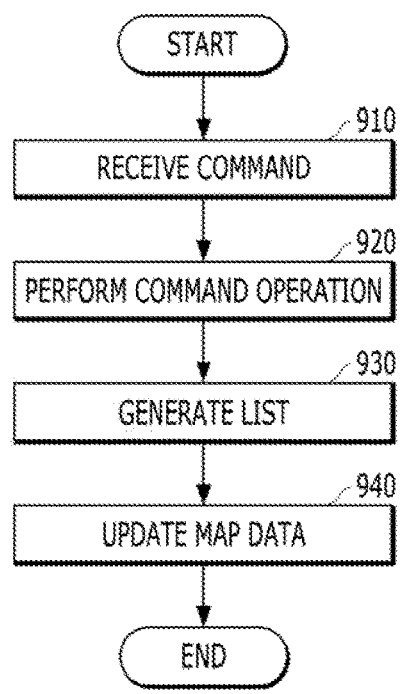
FIG. 9 is a representation of an example of a flow chart illustrating an operation of a memory system in accordance with an embodiment.

FIG. 9 is a flow chart illustrating an operation of a memory system in accordance with an embodiment.

Referring to FIG. 9, at step 910, the memory system receives a command, for example, a write command, from the host 102, and at step 920, performs a command operation corresponding to the command received from the host 102, for example, a program operation corresponding to the write command. The data segments of user data corresponding to the write command received from the host 102 are stored in the pages included in the memory blocks of the memory device 150.

At step 930, in correspondence to the storage of the data segments of the user data in the pages included in the memory blocks of the memory device 150, map information and map segments including the map information is generated, and a map list for the map information and a segment list for the map segments are generated. In the map list, corresponding LPNs may be recorded as the indexes of the respective map information, and the map information may be recorded by being sorted according to the LPNs. Also, in the segment list, there are recorded indexes of the map segments including the respective map information, offsets indicating the positions of the map segments or the positions of the map information included in the respective map segments, and counts indicating the numbers of the map information included in the respective map segments.

Then, at step 940, after quickly searching and checking map information and map segments for performing the command operation corresponding to the command received from the host 102 or a map data update operation, through the map list and the segment list, the command operation or the map data update operation is performed. In particular, by quickly searching and checking map segments which need to be updated, through the map list and the segment list, the corresponding map segments are updated, that is, map data are quickly updated.

Since detailed descriptions were made above with reference to FIGS. 5 to 9 for operations of storing the data segments of user data corresponding to a write command received from the host 102, in the memory blocks of the memory device 150, and, in correspondence to the storage of the data segments of the user data in the memory blocks of the memory device 150, generating and updating the map segments of map data, in particular, generating a map list for map information and a segment list for map segments, and performing a command operation and updating the map data through the map list and the segment list, further descriptions thereof will be omitted herein.

FIGS. 10 to 18 are diagrams schematically illustrating application examples of the data processing system of FIG. 1.

Figure 10:
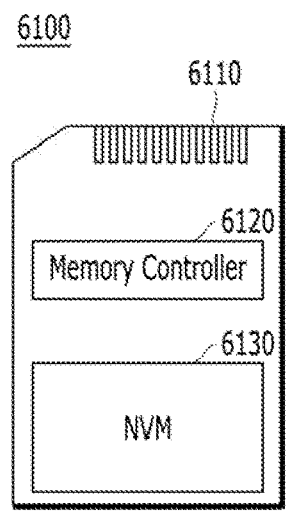
FIGS. 10 to 18 are diagrams schematically illustrating application examples of the data processing system of FIG. 1 in accordance with various embodiments of the present invention.

FIG. 10 is a diagram schematically illustrating another example of the data processing system including the memory system in accordance with the present embodiment. FIG. 10 schematically illustrates a memory card system to which the memory system in accordance with the present embodiment is applied.

Referring to FIG. 10, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIGS. 1 and 5, and the memory device 6130 may correspond to the memory device 150 of the memory system 110 described with reference to FIGS. 1 and 5.

Thus, the memory controller 6120 may include a RAM, a processing unit, a host interface, a memory interface and an error correction unit. The memory controller 130 may further include the elements shown in FIG. 5.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 5.

The memory controller 6120 and the memory device 6130 may be integrated into a single semiconductor device. For example, the memory controller 6120 and the memory device 6130 may construct a solid state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 11:
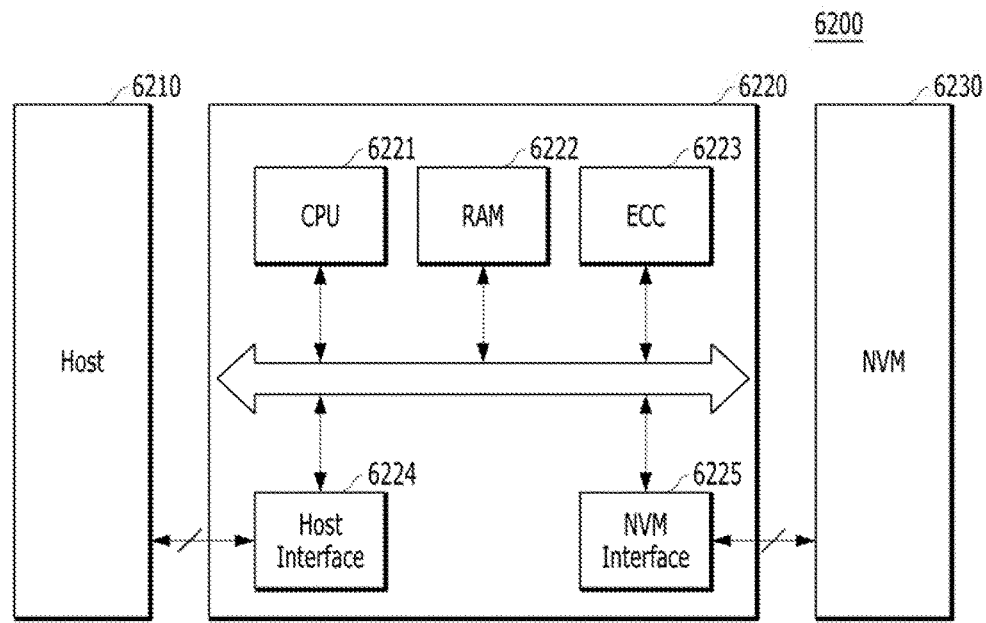

FIG. 11 is a diagram schematically illustrating another example of the data processing system including the memory system in accordance with the present embodiment.

Referring to FIG. 11, the data processing system 6200 may include a memory device 6230 having one or more nonvolatile memories and a memory controller 6220 for controlling the memory device 6230. The data processing system 6200 illustrated in FIG. 11 may serve as a storage medium such as a memory card (CF, SD, micro-SD or the like) or USB device, as described with reference to FIG. 1. The memory device 6230 may correspond to the memory device 150 in the memory system 110 illustrated in FIGS. 1 and 5, and the memory controller 6220 may correspond to the controller 130 in the memory system 110 illustrated in FIGS. 1 and 5.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as the Trellis coded modulation (TCM) or block coded modulation (BCM).

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 12:
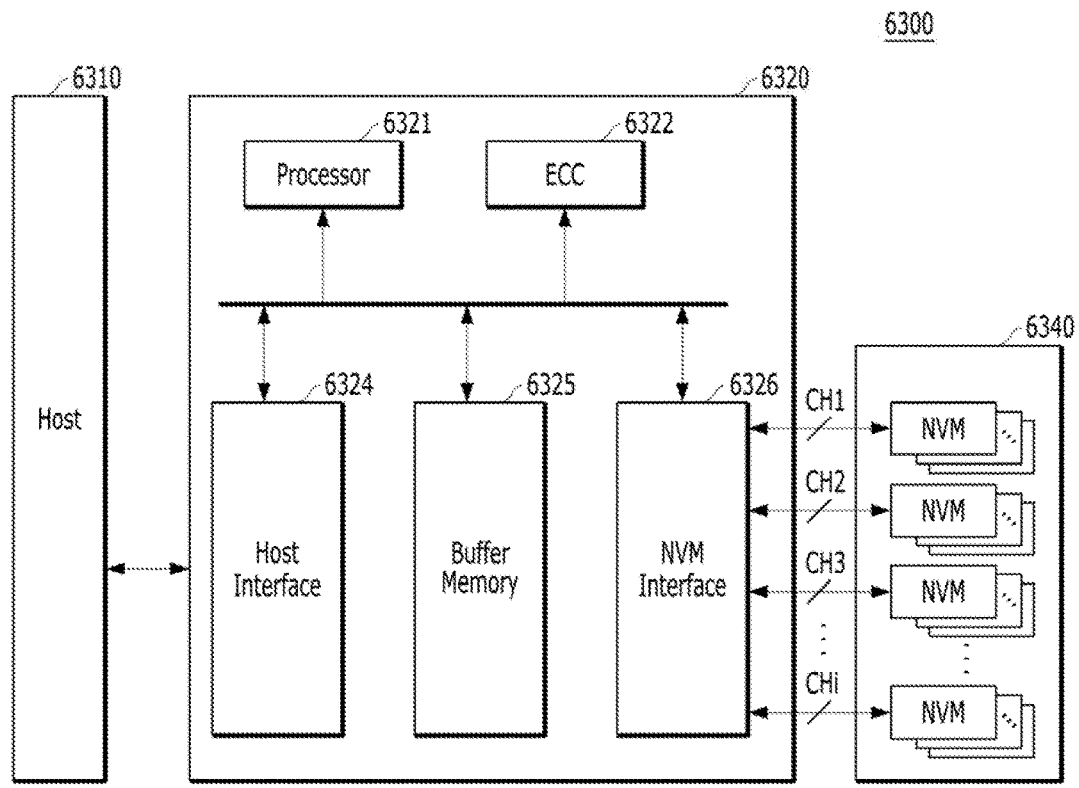

FIG. 12 is a diagram schematically illustrating another example of the data processing system including the memory system in accordance with the present embodiment. FIG. 12 schematically illustrates an SSD to which the memory system in accordance with the present embodiment is applied.

Referring to FIG. 12, the SSD 6300 may include a controller 6320 and a memory device 6340 including a plurality of nonvolatile memories. The controller 6320 may correspond to the controller 130 in the memory system 110 of FIGS. 1 and 5, and the memory device 6340 may correspond to the memory device 150 in the memory system of FIGS. 1 and 5.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 11 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIGS. 1 and 5 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 13:
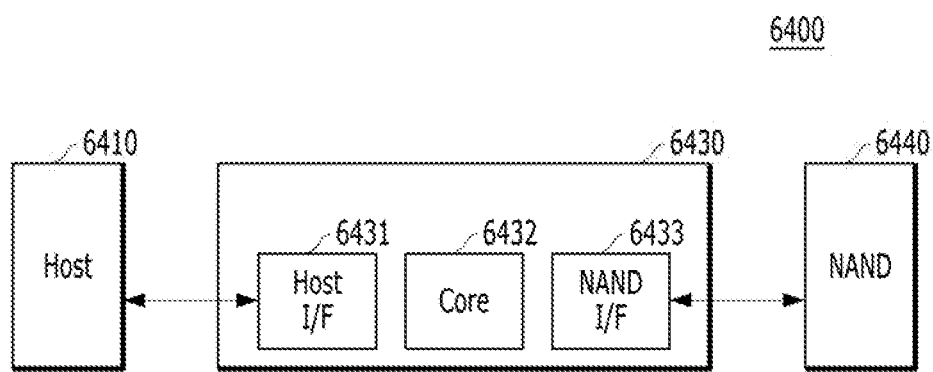

FIG. 13 is a diagram schematically illustrating another example of the data processing system including the memory system in accordance with the present embodiment. FIG. 13 schematically illustrates an embedded Multi-Media Card (eMMC) to which the memory system in accordance with the present embodiment is applied.

Referring to FIG. 13, the eMMC 6400 may include a controller 6430 and a memory device 6440 embodied by one or more NAND flash memories. The controller 6430 may correspond to the controller 130 in the memory system 110 of FIGS. 1 and 5, and the memory device 6440 may correspond to the memory device 150 in the memory system 110 of FIGS. 1 and 5.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 14 to 17 are diagrams schematically illustrating other examples of the data processing system including the memory system in accordance with the present embodiment. FIGS. 14 to 17 schematically illustrate UFS (Universal Flash Storage) systems to which the memory system in accordance with the present embodiment is applied.

Referring to FIGS. 14 to 17, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIGS. 1 and 5. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 11 to 13, and the UFS cards 6530, 6630, 6730 and 6830 may be embodied in the form of the memory card system 6100 described with reference to FIG. 10.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 14:
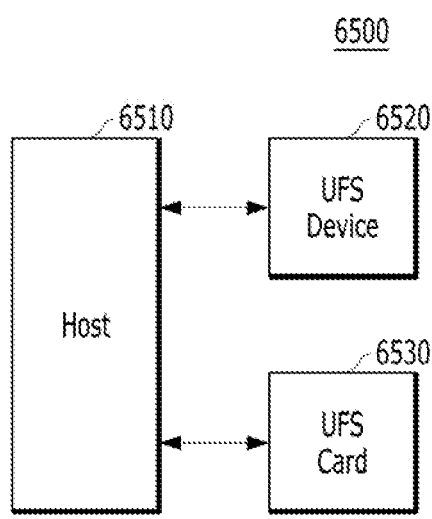

In the UFS system 6500 illustrated in FIG. 14, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 15:
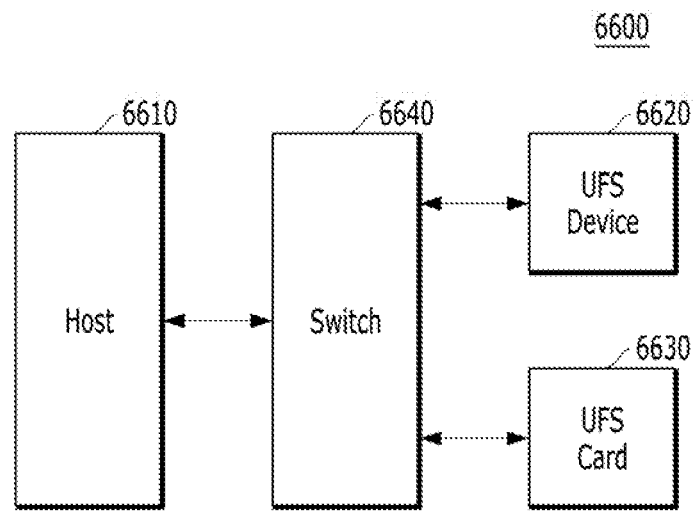

In the UFS system 6600 illustrated in FIG. 15, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 16:
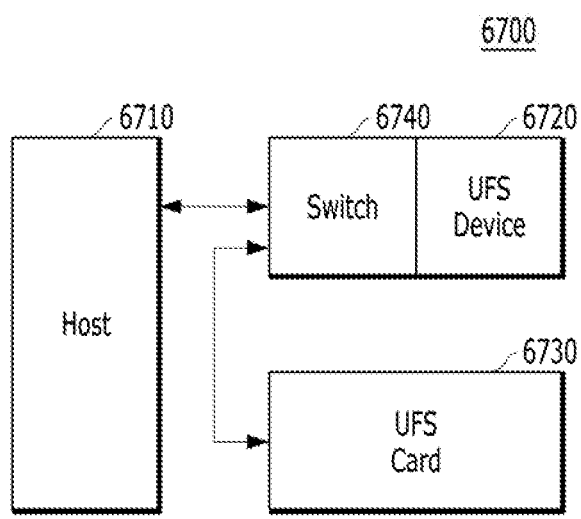

In the UFS system 6700 illustrated in FIG. 16, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 17:
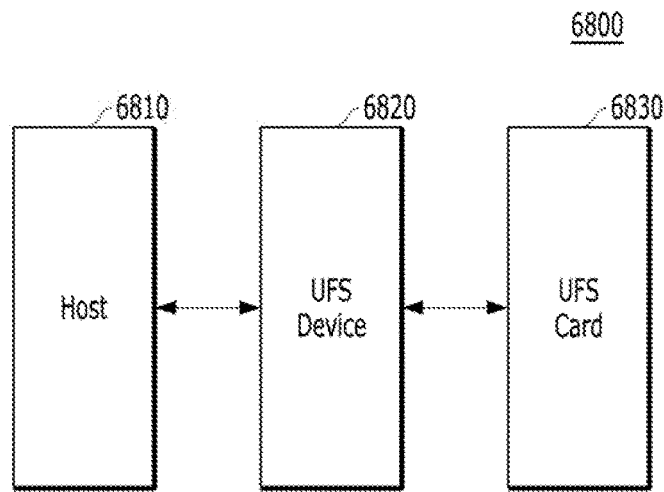

In the UFS system 6800 illustrated in FIG. 17, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 18:
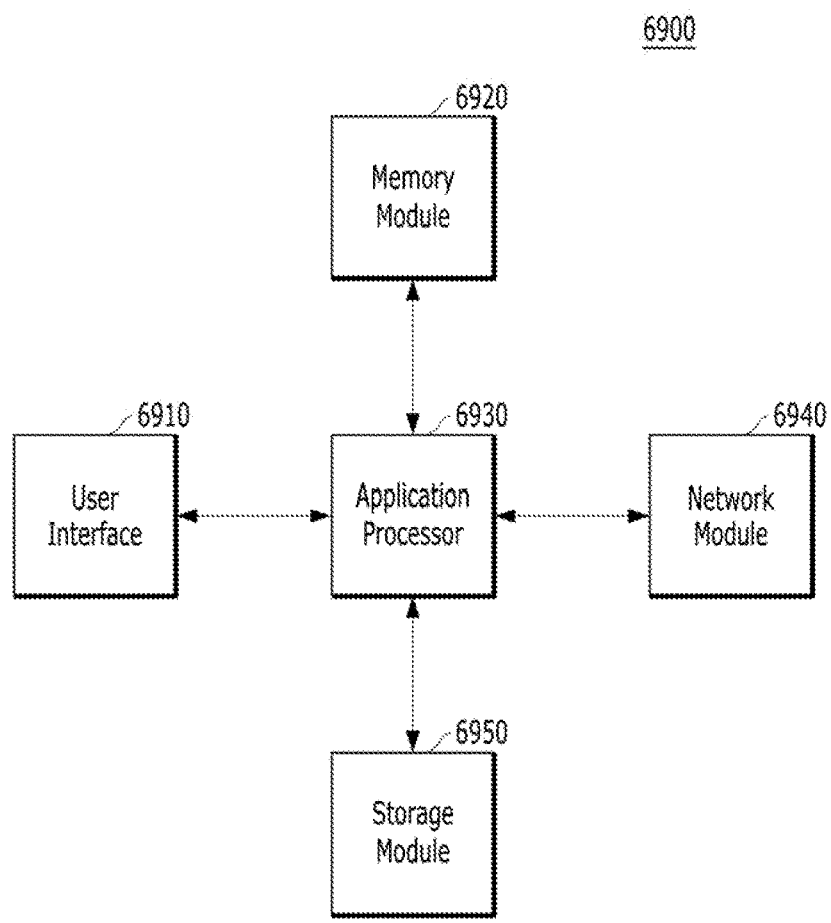

FIG. 18 is a diagram schematically illustrating another example of the data processing system including the memory system in accordance with an embodiment. FIG. 18 is a diagram schematically illustrating a user system to which the memory system in accordance with the present embodiment is applied.

Referring to FIG. 18, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIGS. 1 and 5. Furthermore, the storage module 6950 may be embodied as an SSD, eMMC and UFS as described above with reference to FIGS. 12 to 17.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 and 5 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

The memory system and the operating method thereof according to the embodiments may minimize complexity and performance deterioration of the memory system and maximize use efficiency of a memory device, thereby quickly and stably process data to and from the memory device.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
a memory device including a plurality of memory blocks; and
a controller configured to generate plural map segments each including plural logical addresses, and store the plural map segments in at least one memory block,
wherein the controller stores data segments of user data in the plurality of memory blocks to generate a first list including first logical addresses corresponding to the data segments, respectively, generates a second list including plural information regarding which one of the plural map segments each of the first logical addresses corresponds to, and searches and updates the plural map segments which correspond to the first logical addresses, through the first and second lists.

2. The memory system according to claim 1, wherein the plural information in the second list includes an index indicating which map segment corresponds to the first logical addresses, an offset indicating a position of the first logical addresses in the first list, and a count indicating a count of updated logical addresses in each map segment, which correspond to the first logical addresses.

3. The memory system according to claim 1, wherein the controller further records logical page numbers of the data segments as indexes of map information that includes the first logical addresses corresponding to the data segments, respectively, in the first list.

4. The memory system according to claim 3, wherein, in the second list, the controller further records indexes of the map segments in correspondence to a maximum number of map information to be included in each of the map segments and the indexes of the map information.

5. The memory system according to claim 4, wherein, in the second list, the controller further records offsets and counts of the map segments by the indexes of the map segments.

6. The memory system according to claim 5, wherein the offsets indicate positions of the map information included in the respective map segments in the first list.

7. The memory system according to claim 6, wherein the positions of the map information indicate positions from map information of a first entry in the first list.

8. The memory system according to claim 5, wherein the counts indicate the numbers of map information included in the respective map segments.

9. The memory system according to claim 5, wherein the controller further checks the counts through differences between the offsets of the map segments.

10. The memory system according to claim 4, wherein the controller further sorts the indexes of the map information in the first list, in correspondence to the logical page numbers, and sorts the indexes of the map segments in the second list.

11. A method for operating a memory system including a memory device having a plurality of memory blocks, the method comprising:
generating plural map segments each including plural logical addresses, and storing the plural map segments in at least one memory block;
storing data segments of user data in the plurality of memory blocks to generate a first list including first logical addresses corresponding to the data segments, respectively;
generating a second list including plural information regarding which one of the plural map segments each of the first logical addresses corresponds to; and
searching and updating the plural map segments which correspond to the first logical addresses, through the first and second lists.

12. The method according to claim 11, wherein the plural information in the second list includes an index indicating which map segment corresponds to the first logical addresses, an offset indicating a position of the first logical addresses in the first list, and a count indicating a count of updated logical addresses in each map segment, which correspond to the first logical addresses.

13. The method according to claim 11, wherein the generating of the map segments further comprises recording logical page numbers of the data segments as indexes of map information that includes the first logical addresses corresponding to the data segments, respectively, in the first list.

14. The method according to claim 13, wherein the generating of the map segments further comprises recording, in the second list, indexes of the map segments in correspondence to a maximum number of map information to be included in each of the map segments and the indexes of the map information.

15. The method according to claim 14, wherein the generating of the map segments further comprises recording, in the second list, offsets and counts of the map segments, by the indexes of the map segments.

16. The method according to claim 15, wherein the offsets indicate positions of the map information included in the respective map segments in the first list.

17. The method according to claim 16, wherein the positions of the map information indicates positions from map information of a first entry in the first list.

18. The method according to claim 15, wherein the counts indicate the numbers of map information included in the respective map segments.

19. The method according to claim 15, wherein the generating of the map segments further comprises checking the counts through differences between the offsets of the map segments.

20. The method according to claim 14, wherein the generating of the map segments further comprises sorting the indexes of the map information in the first list, in correspondence to the logical addresses or the logical page numbers, and sorting the indexes of the map segments in the second list.

* * * * *